(12) United States Patent
Ludwig et al.

(10) Patent No.: US 6,265,866 B1
(45) Date of Patent: Jul. 24, 2001

(54) MEASURING DEVICE FOR DETERMINING THE POSITION OF A CONTROL ELEMENT WITH TEMPERATURE RELATED MEASUREMENT ERRORS CORRECTION

(75) Inventors: Norbert Ludwig, Brüggen; Frank Bürger, Düren, both of (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/543,173

(22) Filed: Apr. 5, 2000

(30) Foreign Application Priority Data

Apr. 9, 1999 (DE) .............................................. 199 15 988

(51) Int. Cl.[7] .............................. G01B 7/30; G01R 35/00
(52) U.S. Cl. .................................. 324/207.2; 324/207.12; 324/202
(58) Field of Search .............................. 324/202, 207.12, 324/207.2, 207.21, 207.22, 207.25, 225, 173, 174; 338/32 R, 32 H

(56) References Cited

U.S. PATENT DOCUMENTS 4,893,502 * 1/1990 Kubota et al. ...................... 73/118.1
5,659,389 * 8/1997 Hieb et al. ........................... 356/150

FOREIGN PATENT DOCUMENTS

| 3345804 | 6/1985 | (DE) . |
| 4405513 | 8/1995 | (DE) . |
| 4408056 | 4/1997 | (DE) . |
| 197 09 087 | 9/1998 | (DE) . |

* cited by examiner

*Primary Examiner*—Jay Patidar
(74) *Attorney, Agent, or Firm*—Ladas and Parry

(57) ABSTRACT

A measuring device for determining the position of a control element, such as a throttle valve in which a temperature-resistant Hal sensor (4) cooperates with a permanent magnet (2), which is connected to the control element by a spindle (3), in order to obviate the need for a conventional mechanical potentiometer. By virtue of the Hall effect, the Hall sensor (4) produces during movement of the control element and thus of the position of the permanent magnet (2) relative to the Hall sensor (4), an output signal ($U_a$) that is preferably linearly proportional to the movement of the control element. The Hall sensor (4) is programmed to correct temperature, related measurement errors in the permanent magnet.

9 Claims, 3 Drawing Sheets

MEASURING DEVICE FOR DETERMINING THE POSITION OF A CONTROL ELEMENT WITH TEMPERATURE RELATED MEASUREMENT ERRORS CORRECTION

FIELD OF THE INVENTION

The invention relates to a measuring device for determining the position of a control element.

BACKGROUND OF THE INVENTION

To determine the position of a control element, such as a throttle valve, which is exposed to high temperatures, there are used in known manner mechanical potentiometers which are mechanically connected to the control element. Analog signals are output to an A/D converter and then to an evaluation unit.

A disadvantage of such devices, however, is that the mechanical potentiometers undergo considerable wear, whereby additional interfering variables falsify the measured result.

German Patent Application DE 3345804 A1 discloses an instrument for contactless electronic measurement of the angle of a mechanical actuator. In this instrument a shaft, connected mechanically to the actuator protrudes form the instrument and a rotatable magnet is attached to the shaft. A sensor element is disposed in the casing opposite the rotatable magnet. A Hall element cannot be utilized under these conditions, since the instrument is exposed to relatively high temperatures and thereby output signals of the Hall element drift very greatly. Therefore a flux gate principle and not the Hall effect is used for this purpose.

Various contactless devices containing Hall generators using the Hall effect for measuring lengths and/or angles are disclosed in German Patent Application DE 4405513 A1, German Patent DE 4408056 C2 and German Patent Application DE 1970987 A1. These measuring devices are also imprecise as regards their measured results at relatively high temperatures, since here also the influence of temperature on the magnet and its flux density is not precluded.

SUMMARY OF THE INVENTION

An object of the invention is to provide a measuring device to determine the position of a control element, accurately and at high temperatures.

A further object of the invention is to provide such a measuring device which obviates the need for a mechanical potentiometer by the use of a temperature-resistant Hall sensor and the special design of a permanent magnet, which is connected to a control element by a spindle. By virtue of the Hall effect, the Hall sensor delivers an output signal, during adjustment movement of the control element and thus of the position of the permanent magnet relative to the Hall sensor, that is preferably linearly proportional to the adjustment movement of the control element. At the same time, the Hall sensor is programmed to correct temperature-related measurement errors.

The permanent magnet is configured axially and radially or diametrally and is mounted centrally or eccentrically on the spindle, so that, for example, the position of an exhaust-gas return valve (EGR valve) can be determined.

Since the Hall sensor is programmable, the measuring device can be designed in modular form by means of a switching circuit such as an ASIC unit. The measuring device has space-saving design, and it has constant interface outputs. Calibration and programming of the Hall sensor of the measuring device are achieved during in-circuit use, i.e. when it is being used for the design purpose, and otherwise necessary preprogramming is obviated.

By virtue of this feature of the measuring device, it is capable of checking its functional response by an additional self-test signaling errors that have occurred.

DETAILED DESCRIPTION

Figure 1:
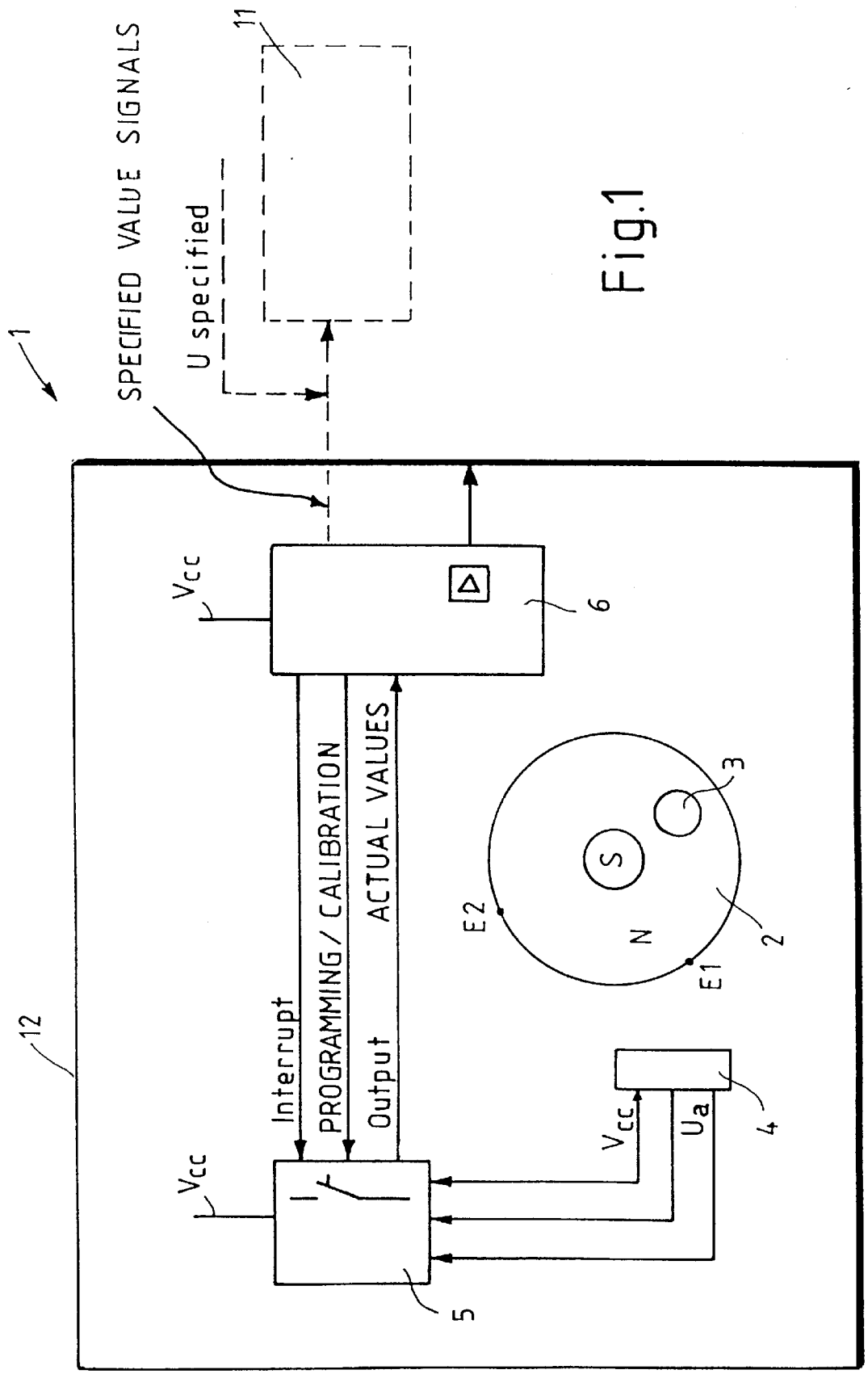
FIG. 1 is a schematic diagram of a measuring device according to the invention.

FIG. 1 illustrates a modular measuring device 1, in which a permanent magnet 2 is fixed on a spindle 3, which is mechanically connected to a control element such as a throttle valve (not shown). Opposite permanent magnet 2 there is disposed in direct proximity a Hall sensor 4. The Hall sensor 4 is temperature-resistant and programmable. Interconnected to Hall sensor 4 is a logic circuit 5, which is connected to a switching circuit 6 of an ASIC unit.

In FIG. 1, permanent magnet 2 is eccentrically supported on spindle 3 for rotation about an axis extending transversely with respect to Hall sensor 4.

Prior to use of measuring device 1, Hall sensor 4 is calibrated and then programmed. For this purpose logic circuit 5 is switched to the programming and calibration mode by an interrupt signal from ASIC switching circuit 6. Via a directional circuit routed to Hall sensor 4, the Hall sensor 4 is briefly stimulated for programming by a pulse-width-modulated signal from ASIC switching circuit 6. Calibration takes place in a first step, in which salient points of a characteristic line required for use for the desired purpose are determined. Assuming that a movement of the control element is possible in a range of angle γ from 7° to 90° in practice, a voltage value $U_{a1}$ corresponding to an angle $\gamma_1=7°$ at salient point E1 and a voltage value $U_{an}$ corresponding to an angle $\gamma_n=90°$ at salient point E2 can be determined as will be explained later. By means of salient points E1, E2 determined in this way, a characteristic line supplied to ASIC switching circuit 6 is converted with respect to position angle γ of the control element into an equivalent voltage characteristic line in Hall sensor 4. This is achieved with software written to Hall sensor 4, which software is stimulated by the pulse-width-modulated signal of ASIC switching circuit 6. As is known, a magnet loses its flux density as the temperature increases. Thereby measurement inaccuracies are known to develop. This influence on permanent magnet 2 is corrected by a temperature characteristic correction line encoded in Hall sensor 4, based on the known variation of flux density in permanent magnet 2 with respect to temperature. Thereby permanent magnet 2 has a constant flux density for Hall sensor 4 despite the influence of temperature. In other words, the variation in flux density of the permanent magnet with respect to temperature is compensated by the programmed Hall sensor 4.

After Hall sensor 4 has been completely calibrated and programmed, logic circuit 5 is switched over to supply voltage $V_{cc}$, which is connected to hall sensor 4 via a bidirectional circuit. Preferably $V_{cc}$ can be pulse-width-modulated.

In the normal installed orientation of permanent magnet 2 opposite Hall sensor 4, the control element is closed (E1= $\gamma_1=7°$), for example, this salient point E1 being disposed directly opposite Hall sensor 4. During adjustment of the control element fixed to spindle 3, permanent magnet 2 is also displaced, thus changing the distance between permanent magnet 2 and Hall sensor 4. Salient point E1, is moved away from Hall sensor 4, while permanent magnet 2 itself approaches Hall sensor 4, so that the flux acting on Hall sensor 4 becomes denser. A rising output voltage $U_a$ is present at the output of Hall sensor 4. At an angular orientation γ of about 90°, permanent magnet 2 reaches its maximum proximity to Hall sensor 4.

Figure 2:
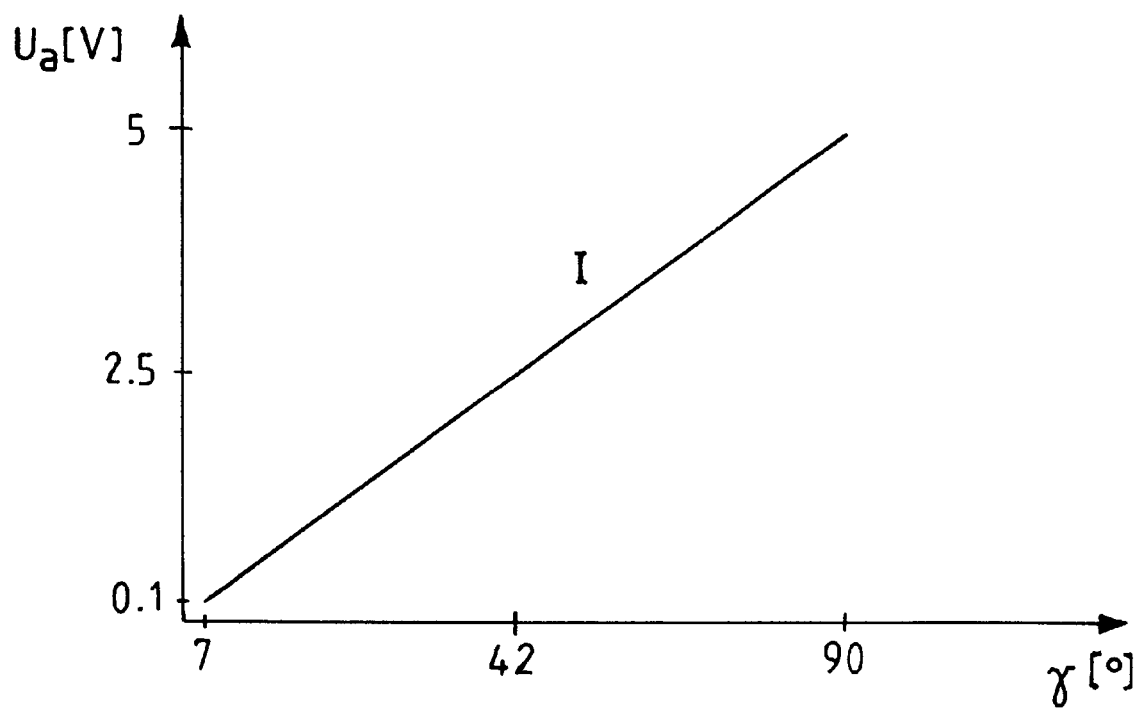
FIG. 2 is a graphical illustration of a voltage characteristic curve at the output of a Hall sensor as a function of an adjustment movement of a positioning element.

Associated characteristic line 1 can be seen in FIG. 2. The value of voltage $U_a$ equivalent to an angle $\gamma_1=90°$ is then 5 volts, for example, while that equivalent to $\gamma_x=42°$ is about 2.5 V. At the same time a correction is also made for the measuring inaccuracies caused by the influence of temperature on permanent magnet 2.

Thus temperature-independent voltage values $U_a$ equivalent to the position of the control element are present at the output of Hall sensor 4.

These individual voltage values $U_a$ pass through logic circuit 5 and are output as actual values to switching circuit 6, while at the same time switching circuit 6 receives, from a separate module (not illustrated), via a specified-value circuit, corresponding specified values of angular orientation/position of the control element. The actual-value signal $U_a$ is output in known manner from switching circuit 6 for further processing, preferably in voltage-amplified form.

In switching circuit 6 itself, there is additionally performed a specified-to-actual comparison of voltage values $U_a$ and of the specified values, which have been converted to corresponding $U_{specified}$. This result is sent as a feedback signal relating, for example, to the functional performance of the control element, from switching circuit 6 via the bidirectional specified-value circuit to a diagnosis tester 11.

Figure 3A:
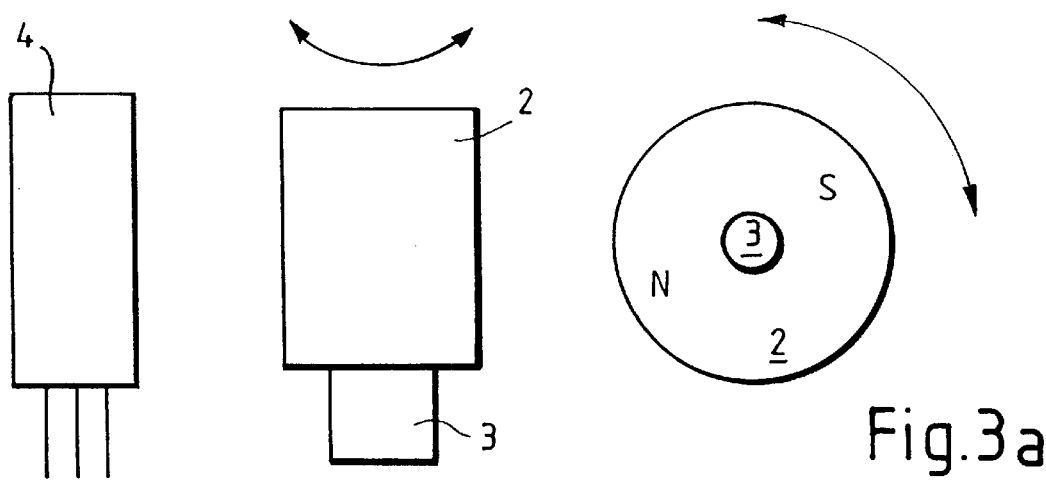
FIGS. 3a, 3b, 3c illustrate alternative embodiments of a permanent magnet of the measuring device shown in FIG. 1.
Figure 3B:
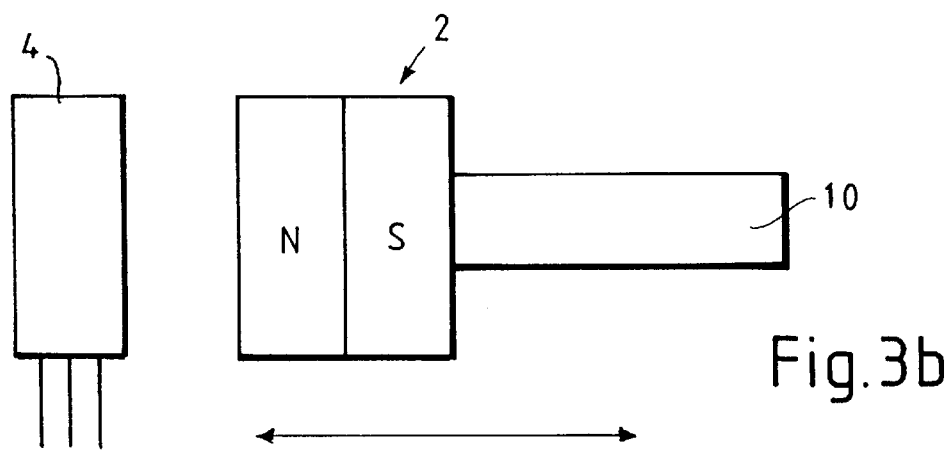
Figure 3C:
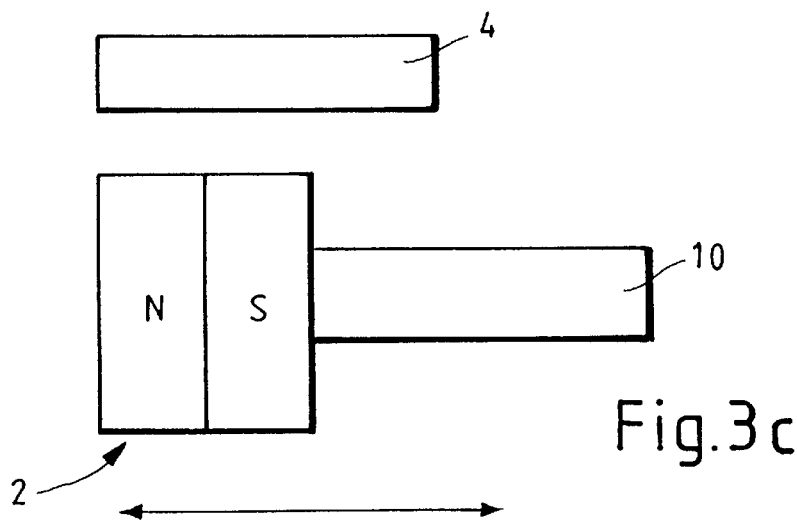

FIG. 3a shows a further embodiment of permanent magnet 2. Thus permanent magnet 2 can also be a diametral magnet. In this case one half has north polarity and the other half south polarity, as is known, for example, in elongated permanent magnets. The necessary north/south separation is defined in Hall sensor 4 during calibration and programming. By this design filed strengths decreasing toward the south transition or toward the north transition are detected by hall sensor 4.

permanent magnet 2 can also be configured as an axial permanent magnet 2 (FIGS. 3b and 3c). A spindle 10 that can move linearly as a plunger changes the distance between Hall sensor 4 and permanent magnet 2 in axial direction. Thus positions of, for example, an exhaust-gas return valve, can also be determined and diagnosed.

The advantage of the disclosed measuring device 1 lies not only in the compact modular design in which all the elements are contained in the casing 12 but also in the smaller structural form. The known leads of a mechanical potentiometer can be used. Because of the programming in Hall sensor 4, the linearity of the known potentiometer can be recreated, but the need to convert analog signals of a potentiometer into digitally processable signals is obviated. At the output of Hall sensor 4 there is present a pulse-width-modulated signal, which can be directly processed by switching circuit 6. The output of Hall sensor 4 is ratiometric and thus independent of voltage fluctuations of supply voltage $V_{cc}$.

Although the invention has been described in relation to specific embodiments thereof it will become apparent to those skilled in the art that numerous modifications and variations can be made within the scope and spirit of the invention as defined in the attached claims.

What is claimed is:

1. A measurement device for determining a position of a displaceable control element comprising:

a permanent magnet adapted for connection with the control element for undergoing displacement in correspondence with displacement of the control element, a temperature resistant, programmable Hall sensor disposed opposite said permanent magnet in direct proximity thereto, a switching circuit connected to said Hall sensor and encoded with characteristic data related to the control element, to produce an output signal indicative of the position of the control element, said permanent magnet being subject to variation in flux density as a function of temperature of the magnet, said Hall sensor being encoded during a calibration stage with data relating flux density variation as a function of temperature so that the output of the switching circuit represents the position of the control element corrected for temperature variation of the control element.

2. A measurement device as claimed in claim 1, comprising a casing in which said permanent magnet, said Hall sensor and said switching circuit are contained to provide the measurement device as a compact, self-contained module.

3. A measurement device as claimed in claim 1, comprising a spindle supporting said permanent magnet, said spindle being adapted for connection to the control element to transmit displacement of the control element to said permanent magnet.

4. A measurement device as claimed in claim 1, wherein said spindle is rotatable by said control element about an axis extending transversely of said Hall sensor.

5. A measurement device as claimed in claim 1, wherein said permanent magnet has a circular configuration and said spindle is concentrically engaged in said permanent magnet.

6. A measurement device as claimed in claim 1, wherein said permanent magnet has a circuit configuration and said spindle is eccentrically engaged in said permanent magnet.

7. A measurement device as claimed in claim 1, wherein said spindle is displaceable towards and way from said Hall sensor in accordance with displacement of said control element.

8. A measurement device as claimed in claim 1, further comprising an electric circuit connected to said switching circuit for providing the output signal to an external diagnostic unit.

9. A measurement device as claimed in claim 1, further comprising a logic circuit connected between said Hall sensor and said switching circuit, said logic circuit being connected to a voltage supply source.

* * * * *